United States Patent [19]
Merz

[11] 4,159,049
[45] Jun. 26, 1979

[54] CHAIN SAW WITH OIL REMOVING BRAKE BAND

[75] Inventor: Walter Merz, Ebersberg, Fed. Rep. of Germany

[73] Assignee: Firma Andreas Stihl, Waiblingen, Fed. Rep. of Germany

[21] Appl. No.: 802,538

[22] Filed: Jun. 1, 1977

[30] Foreign Application Priority Data

Jun. 3, 1976 [DE] Fed. Rep. of Germany ....... 2624835

[51] Int. Cl.² ............................................. F16D 67/02
[52] U.S. Cl. ................................ 192/17 R; 192/107 T; 188/259
[58] Field of Search ............. 192/107 T, 113 B, 17 R; 188/250 G, 249, 259, 264 E, 250 E

[56] References Cited
U.S. PATENT DOCUMENTS

| | | |
|---|---|---|
| 1,483,259 | 2/1924 | Wyland ............................ 188/259 X |
| 1,529,828 | 3/1925 | Barlow ............................ 188/259 X |
| 1,907,483 | 5/1933 | Blume ............................. 188/259 X |
| 1,935,713 | 11/1933 | Herzinger et al. ............. 188/259 X |
| 2,380,230 | 7/1945 | Gatke ............................. 188/259 X |
| 2,703,633 | 3/1955 | Gray ............................. 192/113 B X |
| 3,974,566 | 8/1976 | Pilatowicz ........................ 192/17 A |

*Primary Examiner*—Benjamin W. Wyche
*Attorney, Agent, or Firm*—Schwartz, Jeffery, Schwaab, Mack, Blumenthal & Koch

[57] ABSTRACT

Disclosed is a portable motorized chain saw, comprising: a chain sprocket; clutch means positioned between the chain sprocket and the drive shaft of the motor for selectively coupling the chain sprocket with the drive shaft, the clutch means including a drum member; and a brake band positioned in contiguous relationship with the outer circumferential surface of the drum member and including one or more oil stripping openings therein.

17 Claims, 6 Drawing Figures

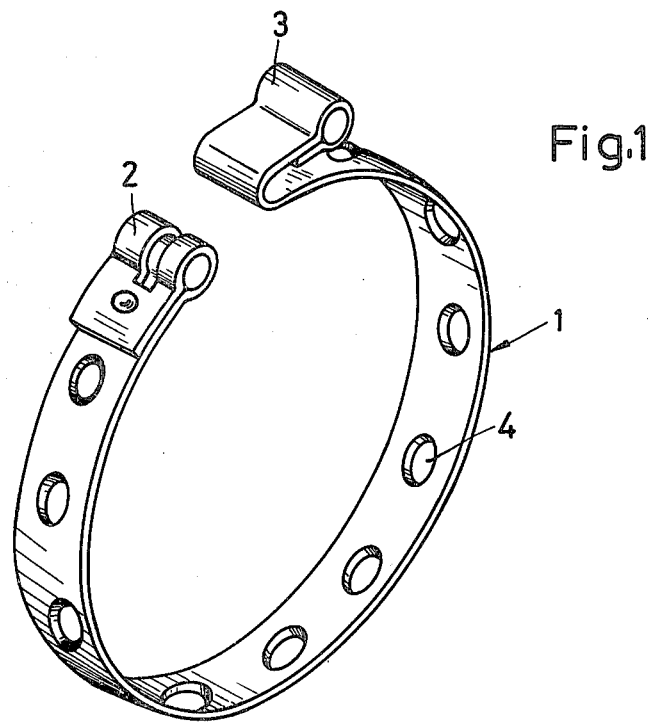
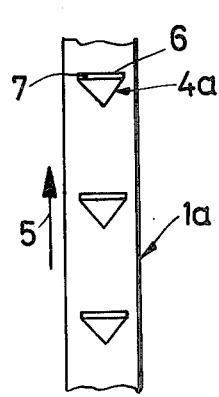
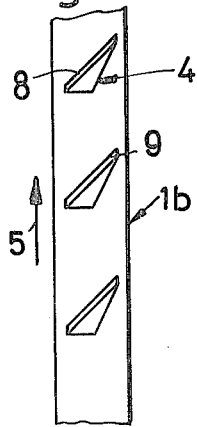
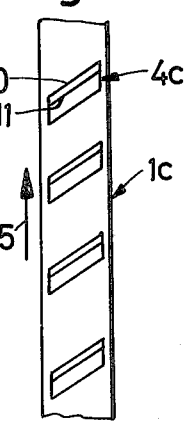
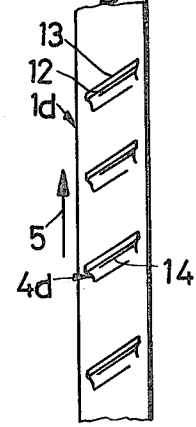

CHAIN SAW WITH OIL REMOVING BRAKE BAND

BACKGROUND OF THE INVENTION

The present invention pertains to a portable motorized chain saw and more particularly to a portable motorized chain saw having a clutch which is arranged between the motor drive shaft and the chain sprocket and wherein a brake band acts on a drum which is adjacent to the chain sprocket.

In the case of motorized chain saws of this type, the chain runs over a guide bar, which is in the same plane as the chain sprocket and, in order to keep friction and wear as small as possible, the chain is constantly lubricated, often by applying drops of oil. This lubrication of the chain necessarily contributes to better adhesion of sawn particles, i.e., saw dust, chips and the like on the chain. Therefore, when considering the small constructional proportions in relation to justifiable expenses, it is practially unavoidable that dirt and oil are thrown out, especially in the area of the sharp change in direction of the chain which occurs at the chain sprocket. In this manner, oil particles, in particular, but also dirt particles reach the area of the contact surface of the brake band on the drum of the clutch, as a result of which the braking effect and thus also the safety of the saw is deleteriously influenced in emergency situations.

SUMMARY OF THE INVENTION

Accordingly, it is an object of the present invention to provide an improved portable motorized chain saw.

Another object of the invention is to provide such a portable motirzed chain saw which is designed in such a manner that the above-mentioned dangers are reduced or avoided.

Still another object is to provide a portable motorized chain saw wherein lubrication and dirtying of the contact surface of the brake band on the drum of the clutch are correspondingly reduced.

Another object of the invention resides in providing an improved brake band design for a portable motorized chain saw.

In accomplishing the foregoing objects, there has been provided in accordance with the present invention a portable motorized chain saw, comprising: a chain sprocket; clutch means positioned between the chain sprocket and the drive shaft of the motor for selectively coupling the chain sprocket with the drive shaft, the clutch means including a drum member; and a brake band positioned in contiguous relationship with the outer circumferential surface of the drum member and including at least one oil stripping opening therein. Preferably, the brake band includes a plurality of said oil stripping openings and each of the openings comprises a sharpened stripping edge located at the forward edge of the opening in the direction of movement of the drum member and at the surface of the brake band which faces the drum member. In accordance with another preferred aspect of the invention, the forward most edge of the opening slants forwardly toward the side of the brake band which is adjacent the chain sprocket.

There has also been provided according to the present invention an improved brake band design as set forth above.

Other objects, features and advantages of the invention will become readily apparent from the detailed description of preferred embodiments which follows, when read in light of the attached figures of drawing.

BRIEF DESCRIPTION OF THE DRAWINGS

FIG. 1 is a perspective view of a brake band according to the invention;

FIGS. 2a to 2d are segmented frontal views illustrating various possibilities of the configuration and shape of cross-sections for oil stripping openings in brake bands for chain brakes of portable motorized chain saws according to the invention, especially of the type illustrated in FIG. 1.

DETAILED DESCRIPTION OF THE PREFERRED EMBODIMENTS

Figure 3:
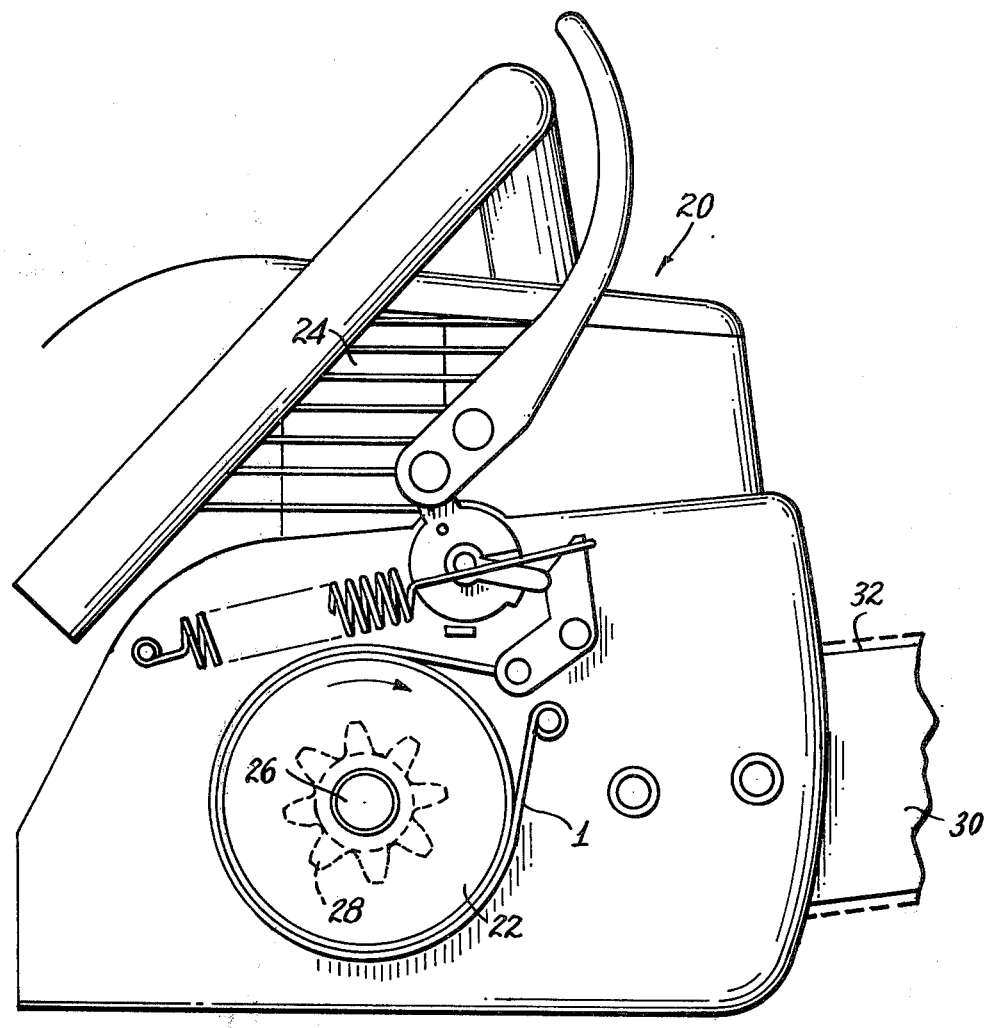
FIG. 3 is a schematic plan view of a portion of a chain saw including a brake band according to the invention.

In accordance with the present invention, a portable motorized chain saw of the type described in the introductory part above is modified so that the brake band is provided with oil stripping openings. By means of these oil stripping openings, in accordance with this invention, the oil, and obviously also the dirt particles, reaching the contact surface between the brake band and the drum of the clutch are removed, whereby the edges of the oil stripping opening act at least in part as stripping edges.

In this case, it proves to be advantageous if at least one oil stripping opening is provided with a sharp stripping edge positioned on its opening side which faces the drum of the clutch and at least on its front edge, in relation to the direction of rotation of the drum of the clutch. This stripping edge can be configured, in particular, so that the edge is disposed at an acute angle with the corresponding tangent on the drum of the clutch.

This edge configuration can be attained in a simple manner by forming the oil stripping opening so that it opens radially conically toward the outside, at least over a portion of its periphery.

While this can be attained in a simple manner in the case of a round cross-section of the oil stripping opening, the formation of the oil stripping opening with a configuration which is not round, e.g., in particular a square opening, affords an additional possibility. Thus, it is possible, with a stripping edge extending essentially over the width of the contact surface and slanted in the direction of rotation obliquely forward toward the chain sprocket which is provided adjacent to the drum of the clutch, to deflect the stripped oil particles in the direction of the chain sprocket and reuse them for chain lubrication.

In the following section, the invention is described in greater detail with reference to exemplary embodiments which illustrate brake bands for configurations for chain brakes of motorized chain saws.

In FIGS. 1 and 3, brake band 1 of a chain brake of a portable motorized chain saw 20 is associated with the drum 22 of the clutch mechanism (not illustrated in detail) which is arranged in the drive train of the motor 24 which includes drive shaft 26 to act as a brake drum. The brake drum is normally adjacent to the chain sprocket 28, which is in the same plane as the plane of the guide bar 30 and over which the saw chain 32 moves. As a result of lubrication of the chain, the drum is exposed to fouling by oil and dirt particles along its circumference, which forms the contact surface for the brake band. The particles lie between the brake band and the drum when brake band 1 is tightened and thus more or less considerably reduce the effect of the brake. Therefore, the particular braking effect which is attained with the tightening of brake band 1, which is provided at its ends with eyes 2 and 3 for connection to a customary linkage which is not illustrated here, cannot be predicted even approximately exactly, if this dirt is not removed. For this purpose, brake band 1 in accordance with this invention is now provided with a number of oil stripping openings 4 over its circumference. These openings have a round cross-section in the embodiment illustrated in accordance with FIG. 1. With a view to improvement of the stripping action, it has proven advantageous in this case to outwardly open or flair the oil stripping openings, so that a sharp edge of the opening results adjacent to the front edge of the drum, in the direction of rotation. The sharp edge removes dirt from the contact surface formed by the drum circumference with a knife-like action. Additional configurations of these oil stripping openings are illustrated in FIGS. 2a through 2d, whereby a section of a corresponding brake band 1a, 1b, 1c, 1d is shown in a view taken radially from the outside.

In the embodiment in accordance with FIG. 2a, the brake band is designated as 1a, and oil stripping openings 4a with a triangular configuration are associated with the brake band. The point of the triangle opposes the direction of rotation of the clutch drum, which direction is symbolized by arrow 5. With an essentially equilateral configuration of the triangular oil stripping opening, the base of the triangle is positioned transverse to the direction of rotation 5 and extends over a significant portion of the width of brake band 1a, so that the contact surface between the brake band 1a and the clutch drum, which serves as brake drum but is not illustrated here, is essentially covered. As a modification of the illustrated embodiment, it would of course also be possible, within the scope of the invention to stagger in the lateral direction the oil stripping openings which are sequentially located with respect to the direction of rotation 5. In order to improve the stripping action, in the configuration in accordance with FIG. 2a, the edge forming the base 6 of the triangle is sharpened as a knife, resulting in a cutting edge 7, of which the sharp edge is disposed next to the clutch drum, which is here not illustrated but which should be imagined as lying underneath the brake band in the drawing.

In the embodiment in accordance with FIG. 2b, the brake band as a whole is designated as 1b and is provided with oil stripping openings 4b. While these openings also comprise a triangular shape, they are configured as non-equilateral triangles in such a manner that the base 8 slants forwardly with respect to the direction of rotation 5, i.e., toward the edge of the brake band 1b which is on the right hand side of the illustration. If the chain sprocket is arranged on the right hand side of the brake band, the stripped oil is directed in the direction of this chain sprocket. In this configuration also, the edge which forms the base 8 is again configured as a knife edge 9, in order to obtain an improved stripping action. In this case, the two legs of the triangle are of unequal length and intersect approximately in the middle of the band.

In the embodiment in accordance with FIG. 2c, a brake band 1c is illustrated in which the oil stripping openings 4c are formed by extended, parallelogram-shaped rectangles. The long sides 10 of the rectangles, with respect to the direction of rotation 5, are forwardly slanted toward the right hand side, to achieve a configuration such as described in connection with FIG. 2b. In order to also obtain an improved stripping action in this case, the edge 10 forming the front, long side with respect to the direction of rotation 5 is configured as a cutting edge 11.

While in the embodiments in accordance with FIGS. 2a through 2c the oil stripping openings are always completely opened, the oil stripping opening 4d in the embodiment in accordance with FIGS. 2d is formed by a rasp-shaped pocket, which is however, open in this case, e.g., like a food grater. For this purpose, as shown in the illustration, brake band 1d is cut open only along the edge 13 of the stripping opening 4d, which is configured as a cutting edge 12, and the opening adjacent to edge 13 results due to the fact that the band is pressed radially outwardly, for example by stamping, so that an open pocket results extending toward the inside of the band. Thus, the pocket extends in the direction of the clutch drum, which is located behind the band, and the pocket is covered by the cap-shaped portion of the band 14, as shown in the illustrated view which is taken from the outside. In this embodiment the cutting edge 12 is slanted obliquely toward the outside, i.e., away from the saw and toward the chain sprocket so that here also a movement of the stripped particles results in the direction of the chain sprocket, which is here imagined as being located on the right hand side adjacent to the band.

What is claimed is:

1. A portable motorized chain saw, comprising:
  a chain sprocket;
  clutch means positioned between the chain sprocket and the drive shaft of the motor for selectively coupling the chain sprocket with the drive shaft, said clutch means including a drum member; and
  a brake band comprising an arcuate band of metal positioned in contiguous relationship with the outer circumferential surface of the drum member, and having eyelet means positioned at each end of said band for connecting the band to a brake actuating mechanism, said brake band including a plurality of oil stripping openings spaced one behind the other along the circumference of the brake band which is in contiguous relationship with said drum member, each of said openings comprising a sharpened stripping edge located at the forward edge of the opening in the direction of movement of said drum member and at the surface of the brake band which faces the drum member and opening freely toward the surface of the brake band facing away from the drum member.

2. The portable motorized chain saw as defined by claim 1, wherein said sharpened stripping edge is essentially linear and slants at an acute angle with respect to the corresponding tangent on the drum member.

3. The portable motorized chain saw as defined by claim 1, wherein said oil stripping openings have a circular cross-sectional configuration.

4. The portable motorized chain saw as defined by claim 3, wherein the edges of said oil stripping openings slope radially, conically from the surface of the brake band which faces the drum member outwardly.

5. The portable motorized chain saw as defined by claim 1, wherein said oil stripping openings have a polygonal cross-sectional configuration.

6. The portable motorized chain saw as defined by claim 5, wherein the forwardmost edge of each of said polygonal oil stripping openings, in the direction of movement of the drum member, extends transversely across substantially the width of the contact surface of the brake band when brought into contact with the drum member.

7. The portable motorized chain saw as defined by claim 6, wherein said forwardmost edge slants forwardly toward the side of the brake band which is adjacent the chain sprocket.

8. The portable motorized chain saw as defined by claim 5, wherein the forwardmost edge of each of said polygonal oil stripping openings, in the direction of movement of the drum member, slants forwardly toward the side of the brake band which is adjacent the chain sprocket.

9. The portable motorized chain saw as defined by claim 5, wherein said oil stripping openings have a triangular shaped cross-sectional configuration.

10. The portable motorized chain saw as defined by claim 5, wherein said oil stripping openings have a quadrilateral shaped cross-sectional configuration.

11. The portable motorized chain saw as defined by claim 10, wherein said oil stripping openings have a parallelogram shaped cross-sectional configuration.

12. The portable motorized chain saw as defined by claim 1, wherein said oil stripping openings are staggered with respect to one another along the circumference of the brake band.

13. The portable motorized chain saw as defined by claim 1, wherein said oil stripping openings comprise apertures through the brake band.

14. The portable motorized chain saw as defined by claim 1, wherein said oil stripping openings have openings comprising vent-shaped openings which are partially open and partially covered by a hood portion displaced radially outwardly from the circumference of the brake band.

15. A brake band for use in a portable motorized chain saw of the type having a chain sprocket, clutch means positioned between the chain sprocket and the drive shaft of the motor for selectively coupling the chain sprocket with the drive shaft, the clutch means including a drum member about which the brake band is adapted to be positioned in contiguous circumferential relationship, said brake band comprising an arcuate band of metal having therein a plurality of oil stripping openings spaced one behind the other along the circumference of said band which is in contiguous relationship with said drum member, each of at least one of said oil stripping openings comprising a sharpened stripping edge located at the forward edge of the opening in the direction of movement of said drum member and at the surface of the brake band which faces the drum member and opening freely toward the surface of the brake band facing away from the drum member, and eyelet means positioned at each end of said band for connecting the band to a brake activating mechanism.

16. The brake band as defined by claim 15, wherein said oil stripping openings have a circular cross-sectional configuration.

17. The brake band as defined by claim 16, wherein the edges of said oil stripping openings slope radially, conically from the surface of the brake band which faces the drum member outwardly.

* * * * *